United States Patent
Chen et al.

(10) Patent No.: US 8,696,172 B2
(45) Date of Patent: *Apr. 15, 2014

(54) LENS AND LAMP USING THE SAME

(75) Inventors: Shih-Feng Chen, New Taipei (TW);
Jia-Chyi Feng, New Taipei (TW);
Han-Tsung Hsueh, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 79 days.

This patent is subject to a terminal disclaimer.

(21) Appl. No.: 13/209,441

(22) Filed: Aug. 15, 2011

(65) Prior Publication Data

US 2012/0044700 A1    Feb. 23, 2012

Related U.S. Application Data

(60) Provisional application No. 61/375,860, filed on Aug. 22, 2010.

(30) Foreign Application Priority Data

Jun. 1, 2011    (TW) .............................. 100119236 A

(51) Int. Cl.
*F21V 3/00*    (2006.01)

(52) U.S. Cl.
USPC .................................................... 362/311.02

(58) Field of Classification Search
USPC .................................................... 362/311.02
See application file for complete search history.

(56) References Cited

U.S. PATENT DOCUMENTS

| | | | |
|---|---|---|---|
| 7,236,029 B2 | 6/2007 | Gossmann | |
| 7,489,453 B2* | 2/2009 | Chinniah et al. | 359/727 |
| D625,462 S * | 10/2010 | Ku et al. | D26/128 |
| 2007/0109791 A1* | 5/2007 | Chinniah et al. | 362/334 |
| 2007/0195534 A1 | 8/2007 | Ha et al. | |
| 2009/0034269 A1* | 2/2009 | Li | 362/332 |
| 2009/0059620 A1* | 3/2009 | Chen | 362/613 |

FOREIGN PATENT DOCUMENTS

| | | |
|---|---|---|
| CN | 100480573 | 4/2009 |
| CN | 201281290 Y | 7/2009 |
| CN | 101556023 A | 10/2009 |
| CN | 201448661 U | 5/2010 |

(Continued)

OTHER PUBLICATIONS

"First Office Action of China Counterpart Application", issued on Jul. 31, 2012, p. 1-p. 7, in which the listed references were cited.

(Continued)

*Primary Examiner* — Anh Mai
*Assistant Examiner* — Hana Featherly
(74) *Attorney, Agent, or Firm* — Jianq Chyun IP Office

(57) ABSTRACT

A lens and a lamp using the same are provided. The lamp includes a lampshade, a base, a lens and a light emitting diode (LED). The lampshade and the lens are assembled on the base, wherein the lens is located in the lampshade. The lens has an accommodating portion, a first light exiting surface and a second light exiting surface. The first light exiting surface is located above the accommodating portion, and the second light exiting surface surrounds the first light exiting surface and located outside the accommodating portion. The first and second light exiting surfaces are concaves. The LED is disposed in the accommodating portion of the lens.

12 Claims, 6 Drawing Sheets

(56) References Cited

FOREIGN PATENT DOCUMENTS

| | | |
|---|---|---|
| CN | 201731297 U | 2/2011 |
| TW | 569476 | 1/2004 |
| TW | 200909938 | 3/2009 |
| TW | I318803 | 12/2009 |
| TW | D137781 | 11/2010 |

OTHER PUBLICATIONS

U.S. Appl. No. 13/174,799, filed Jul. 1, 2011, Hsueh et al.
"Office Action of Taiwan Counterpart Application", issued on May 23, 2013, p. 1-10, in which the listed references were cited.

* cited by examiner

LENS AND LAMP USING THE SAME

CROSS-REFERENCE TO RELATED APPLICATION

This application claims the priority benefit of U.S. provisional application serial no. 61/375,860, filed on Aug. 22, 2010. This application also claims the priority of Taiwan application serial no. 100119236, filed Jun. 1, 2011. The entirety of each of the above-mentioned patent applications is hereby incorporated by reference herein and made a part of this specification.

BACKGROUND OF THE INVENTION

1. Field of the Invention

The invention relates to a lamp. Particularly, the invention relates to a lens and a lamp using the same.

2. Description of Related Art

In daily life, light emitting diodes (LEDs) have been widely used due to its advantages of small size and long service life.

It should be noticed that in a conventional LED application, since the LED is a directional light source, a light direct irradiating area located in front of the LED generally has high brightness, and light indirect irradiating areas have brightness lower than that of the light direct irradiating area. Due to the directionality of the LED, the LED is generally used in lamps requiring local high brightness, and when it is used in a decorative lighting lamp, problems of uneven brightness and relatively small viewing angle range are encountered.

SUMMARY OF THE INVENTION

The invention is directed to a lens with a simple shape, which is capable of improving a viewing angle range of a directional light source.

The invention is directed to a decorative lamp using a light emitting diode (LED) as a light source and having a relatively large viewing angle range.

The invention provides a lens, and a LED is adapted to be disposed in the lens. The lens has an accommodating portion, a first light exiting surface and a second light exiting surface. The first light exiting surface is located above the accommodating portion, and the second light exiting surface surrounds the first light exiting surface and located outside the accommodating portion. The first and second light exiting surfaces are concaves.

In an embodiment of the invention, the accommodating portion has a top light incident surface and a side light incident surface. The top light incident surface is located above the LED, and the side light incident surface surrounds the top light incident surface, and the LED is located in the side light incident surface.

In an embodiment of the invention, the first light exiting surface has a first sub light exiting surface and a second sub light exiting surface. The first sub light exiting surface is a plane and parallel to the top light incident surface, and the second sub light exiting surface surrounds the first sub light exiting surface and is connected to the second light exiting surface.

In an embodiment of the invention, the second sub light exiting surface is a slope or a curved surface.

In an embodiment of the invention, a cross-section of the first light exiting surface has a funnel shape.

In an embodiment of the invention, a diameter of the first sub light exiting surface is 0.5 mm.

In an embodiment of the invention, the second light exiting surface has a third sub light exiting surface and a fourth sub light exiting surface. The third sub light exiting surface is connected to the first light exiting surface, and the fourth sub light exiting surface is coaxial with the side light incident surface of the accommodating portion.

The invention provides a lamp including a lampshade, a base, a lens and a light emitting diode (LED). The base and the lampshade are assembled together, and the lens is disposed on the base and located in the lampshade. The lens has an accommodating portion, a first light exiting surface and a second light exiting surface. The first light exiting surface is located above the accommodating portion, and the second light exiting surface surrounds the first light exiting surface and is located outside the accommodating portion. The first and second light exiting surfaces are concaves. The LED is disposed in the accommodating portion of the lens.

In an embodiment of the invention, the accommodating portion has a top light incident surface and a side light incident surface. The top light incident surface is located above the LED, and the side light incident surface surrounds the top light incident surface, and the LED is located in the side light incident surface.

In an embodiment of the invention, the first light exiting surface has a first sub light exiting surface and a second sub light exiting surface. The first sub light exiting surface is a plane and parallel to the top light incident surface, and the second sub light exiting surface surrounds the first sub light exiting surface and is connected to the second light exiting surface.

In an embodiment of the invention, the second sub light exiting surface is a slope or a curved surface.

In an embodiment of the invention, a cross-section of the first light exiting surface has a funnel shape.

In an embodiment of the invention, a diameter of the first sub light exiting surface is 0.5 mm In an embodiment of the invention, the second light exiting surface has a third sub light exiting surface and a fourth sub light exiting surface. The third sub light exiting surface is connected to the first light exiting surface, and the fourth sub light exiting surface is coaxial with the side light incident surface of the accommodating portion.

According to the above descriptions, the lens of the invention has a simple shape and a larger viewing angle range than convention, and the lens used in the lamp can change an optical path of the LED, so that the LED serving as the directional light source can also be applied in the decorative lamps.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
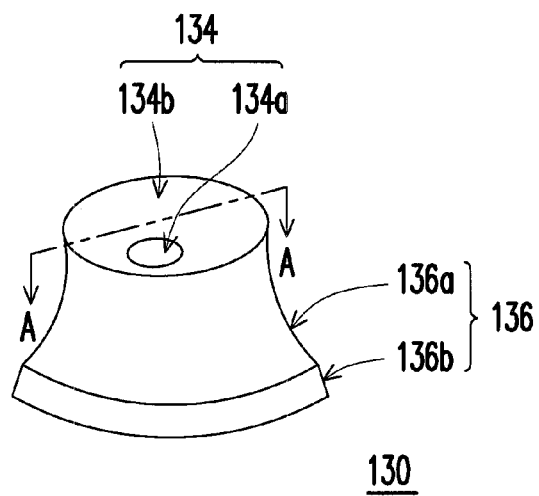
FIG. 1 is a three-dimensional view of a lens according to an embodiment of the invention.
Figure 2:
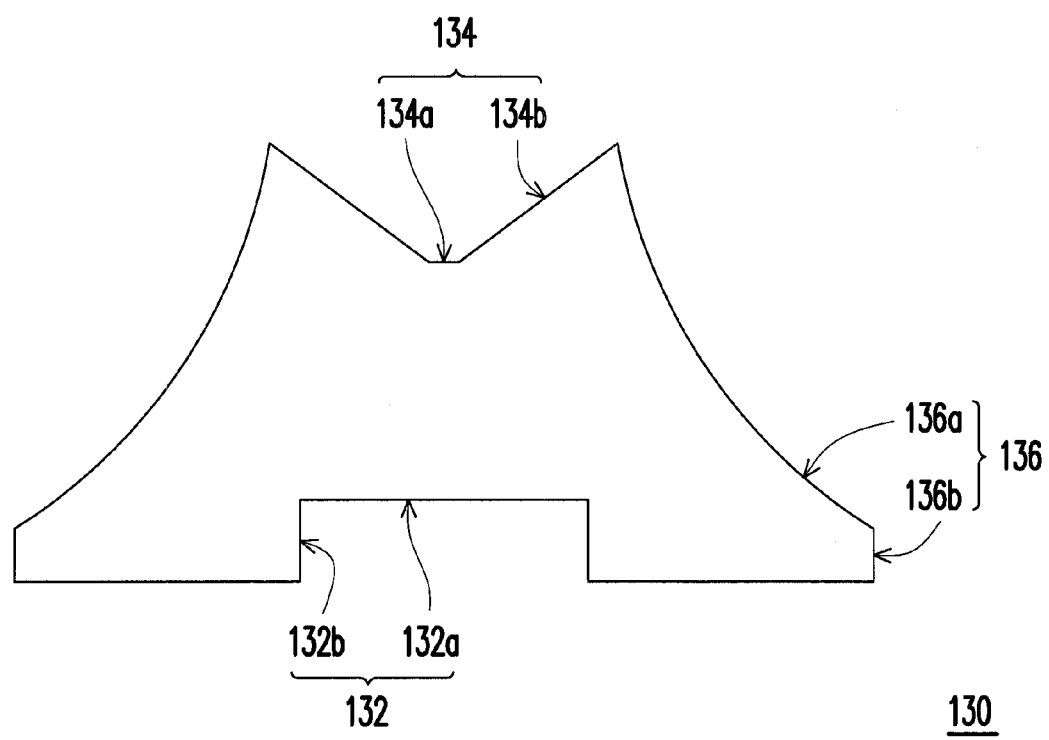
FIG. 2 is a cross-sectional view of the lens along a section line A-A of FIG. 1.

FIG. 1 is a three-dimensional view of a lens according to an embodiment of the invention, and FIG. 2 is a cross-sectional view of the lens along a section line A-A of FIG. 1. Referring to FIG. 1 and FIG. 2, the lens 130 has an accommodating portion 132, a first light exiting surface 134 and a second light exiting surface 136. The first light exiting surface 134 is located above the accommodating portion 132, and the second light exiting surface 136 surrounds the first light exiting surface 134 and located outside the accommodating portion 132. The first light exiting surface 134 and the second light exiting surface 136 are concaves. In detail, the accommodating portion 132 accommodates a light source, and a main function of the lens 130 of the present embodiment is to ameliorate an application range of a directional light source, so that the lens 130 is used for covering a light emitting diode.

The accommodating portion 132 of the lens 130 has a top light incident surface 132a and a side light incident surface 132b, where the top light incident surface 132a is a plane, and the side light incident surface 132b surrounds the top light incident surface 132a, and the top light incident surface 132a and the side light incident surface 132b commonly form a space for accommodating the LED.

Moreover, the first light exiting surface 134 has a first sub light exiting surface 134a and a second sub light exiting surface 134b, wherein the first sub light exiting surface 134a is a plane and is parallel to the top light incident surface 132a, and the second sub light exiting surface 134b surrounds the first sub light exiting surface 134a and is connected to the second light exiting surface 136. In the present embodiment, the second sub light exiting surface 134b is a slope. In other words, a cross-section of the first light exiting surface 134 has a funnel shape.

Moreover, the second light exiting surface 136 has a third sub light exiting surface 136a and a fourth sub light exiting surface 136b, wherein the third sub light exiting surface 136a is connected between the first light exiting surface 134 and the fourth sub light exiting surface 136b, and the fourth sub light exiting surface 136b is coaxial with the side light incident surface 132b of the accommodating portion 132.

Figure 3:
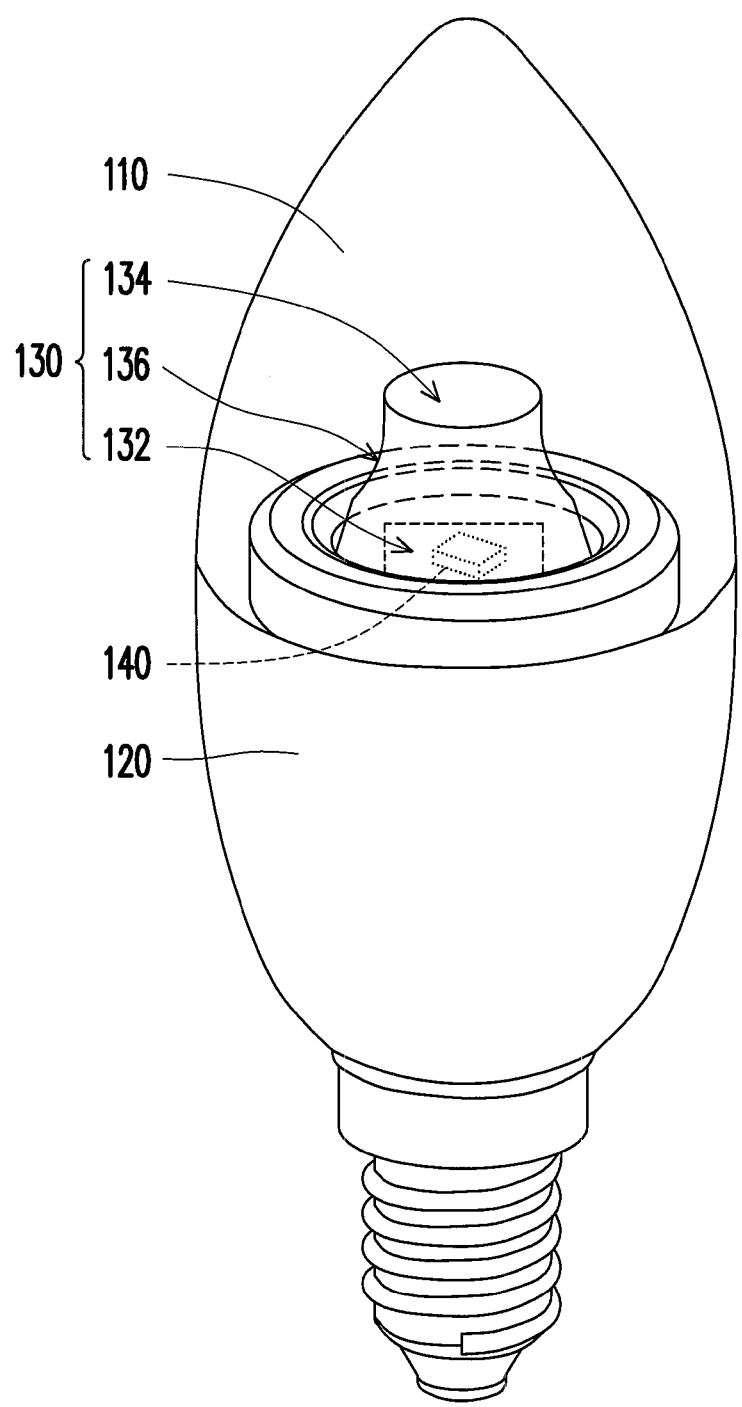
FIG. 3 is a schematic diagram of a lamp using the lens of FIG. 1.
Figure 4:
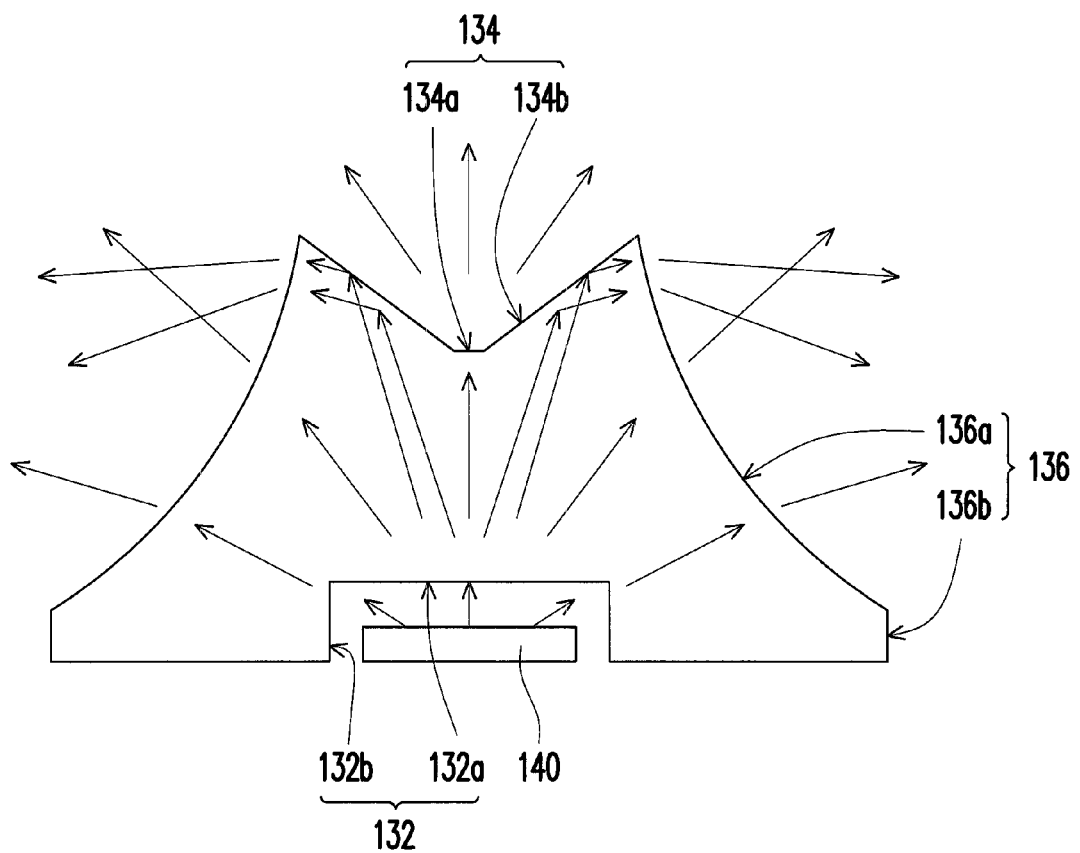
FIG. 4 is a schematic diagram of optical paths of light in the lens that is emitted from a light emitting diode.
Figures 1, 4:
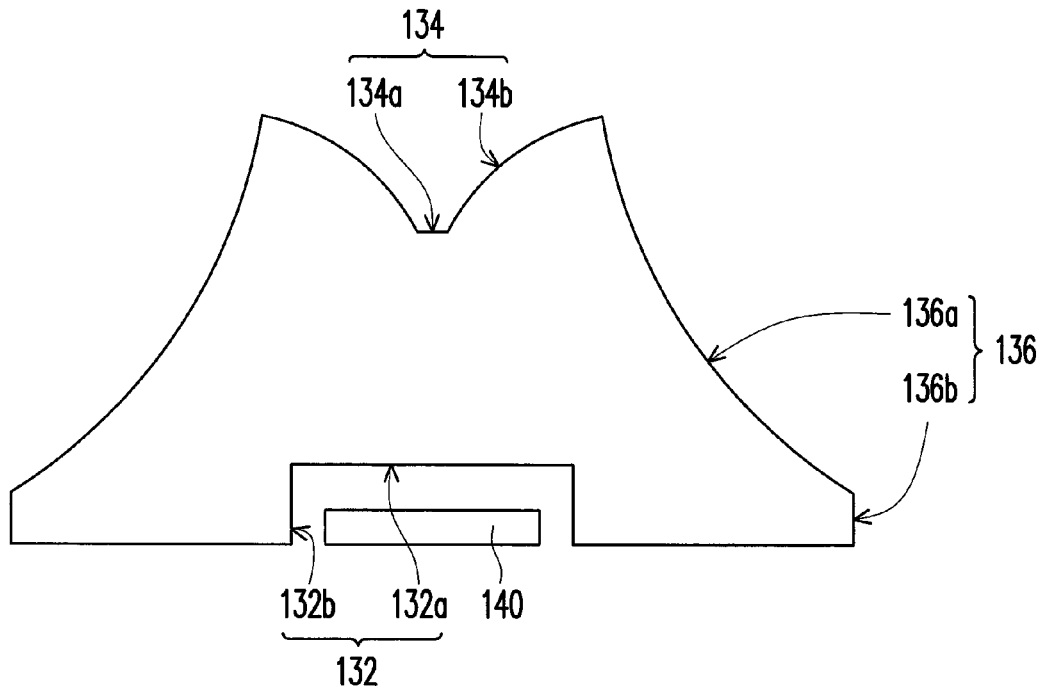
Figures 2, 4:
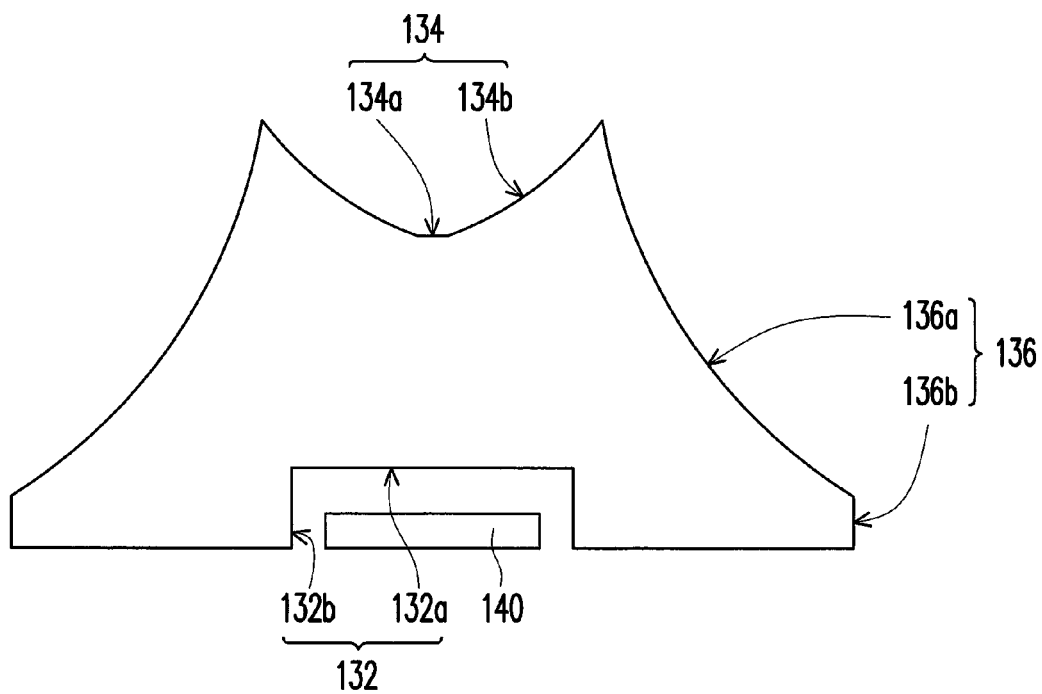

FIG. 3 is a schematic diagram of a lamp using the lens of FIG. 1, and FIG. 4 is a schematic diagram of optical paths of light in the lens that is emitted from the LED. Referring to FIG. 3 and FIG. 4, the lens 130 is applied in a lamp 100, and the lamp 100 includes a lampshade 110, a base 120, the aforementioned lens 130 and a LED 140. The base 120 and the lampshade 110 are assembled together, and the lens 130 is disposed on the base 120 and located in the lampshade 110. The LED 140 is disposed in the accommodating portion 132 of the lens 130, and a light emitting surface of the LED 140 faces to the top light incident surface 132a of the accommodating portion 132.

When the LED 140 emits light, the light enters the lens 130 through the top light incident surface 132a and the side light incident surface 132b, and since the LED 140 is a directional light source, most of the light enters the lens 130 through the top light incident surface 132a.

A part of the light entering the lens 130 is projected to the third sub light exiting surface 136a and the fourth sub light exiting surface 136b of the second light exiting surface 136, and a part of the light is projected to the first light exiting surface 134, wherein the light projected to the first sub light exiting surface 134a directly emits out of the lens 130 due to an incident angle thereof, and the light projected to the second sub light exiting surface 134b is reflected by the second sub light exiting surface 134b due to an incident angle thereof, and emits towards the third sub light exiting surface 136a.

Figure 5:
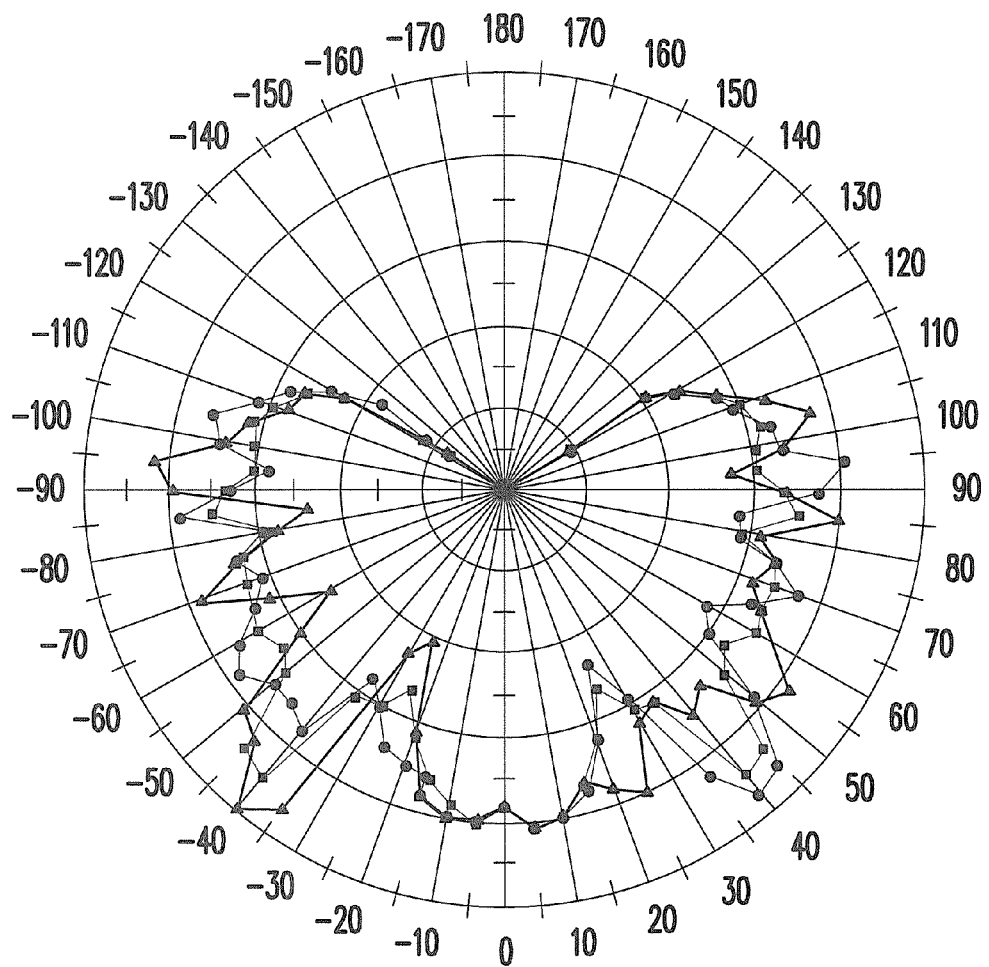
FIG. 5 is a schematic diagram of a viewing angle range of the lamp of FIG. 3 obtained through software simulation.
Figure 6:
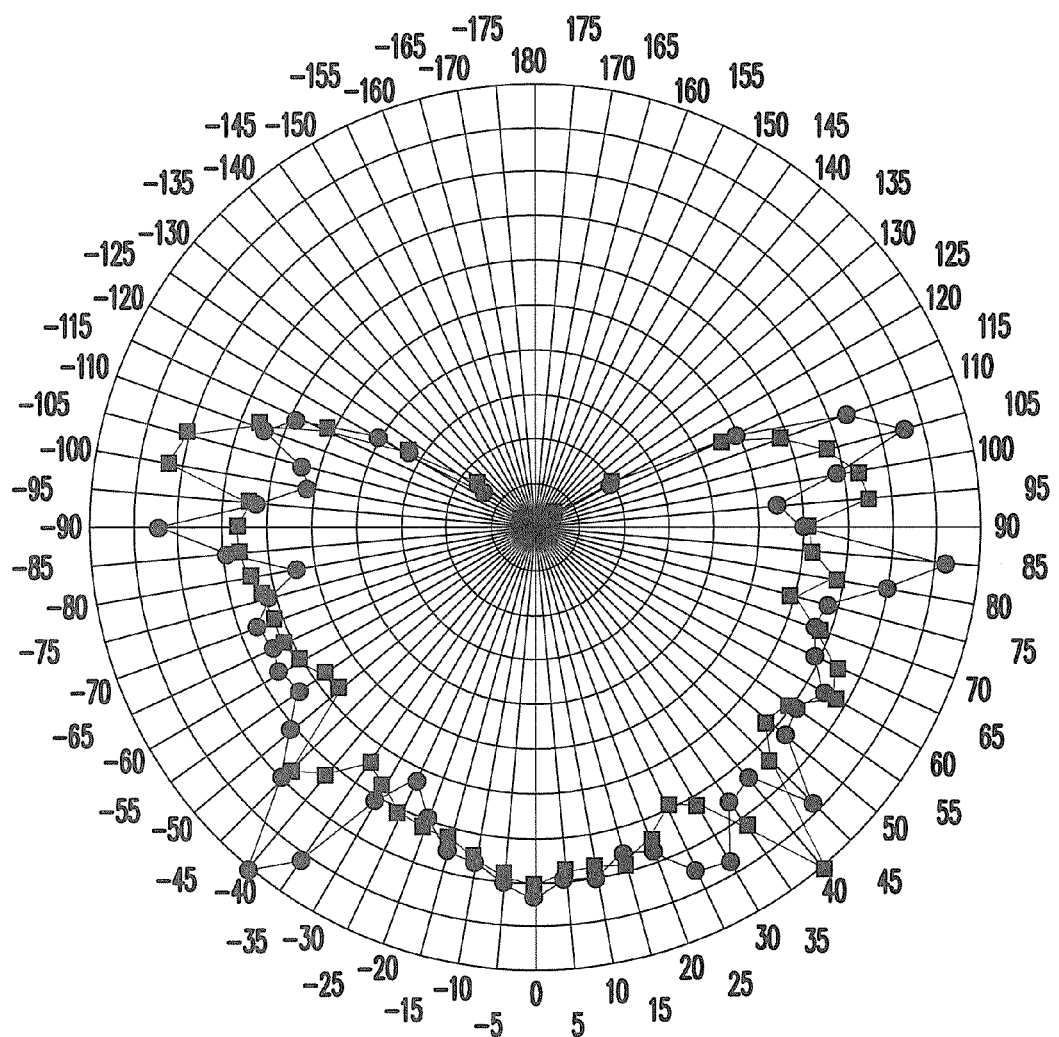
FIG. 6 is a schematic diagram of a viewing angle range of the lamp of FIG. 3 obtained through an actual measurement.

According to FIG. 4, it is known that if the first light exiting surface 134 is a plane, after the light emitted from the LED 140 is projected to the first light exiting surface 134, it directly emits out of the lamp, so that a viewing angle range of the lamp 100 is concentrated in a light emitting direction of the LED 140, which leads to a problem of uneven brightness due to that the light is concentrated to the front of the lamp 100. By ameliorating the lens 130, the first light exiting surface 134 has the planar first sub light exiting surface 134a and the slant second sub light exiting surface 134b that forms an included angle with the first sub light exiting surface 134a, wherein a diameter of the first sub light exiting surface 134a is equal to or greater than 0.5 mm, so that the light emitted from the LED 140 can still emit out through the first sub light exiting surface 134a (i.e. the light emitting direction). Moreover, the second sub light exiting surface 134b can further reflect the light projected thereon to the third sub light exiting surface 136a for emitting, so as to improve the light viewing angle range of the lamp 100. FIG. 5 and FIG. 6 are schematic diagrams of viewing angle ranges of the lamp of FIG. 3, where FIG. 5 is a graphics obtained through software simulation, and FIG. 6 is a graphics obtained through an actual measurement. According to FIG. 5 and FIG. 6, it is known that the viewing angle range of the lamp 100 may reach about ±110 degrees. Taking 0 degree as the front of the lamp 100, lighting of the lamp 100 can also be viewed by a user from the rear of the lamp 100, which ameliorates a situation that the conventional directional light source can only be applied in lamps with fixed irradiation directions. By using the lens 130 of the present embodiment, a candle-style lamp can also use the LED as a light source. Moreover, the lamp 100 may have an even brightness.

In the aforementioned embodiment, although the second sub light exiting surface 134b of a slope is taken as an example for descriptions, in other embodiments that are not illustrated, the second sub light exiting surface 134b can also be a curved surface such as a convex or a concave as long as partial penetration and partial reflection of the light is achieved to increase the light viewing angle range.

In the above descriptions, the "concave" refers to bend inwards the lens 130, and the "convex" refers to bend outwards the lens 130, and those skilled in the art should have known that the "concave" and the "convex" described in the aforementioned embodiment are relative concepts, and the invention is not limited to the text descriptions or figure expressions of the aforementioned embodiment.

In summary, the lens of the invention has a simple shape. Moreover, by using the lens in collaboration with the LED with directionality, the viewing angle range of the LED can be ameliorated, so that the LEI) can also be applied in decorative lamps, by which an application level of the LED is improved, and the lamp using the LED as a light source may have even brightness.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A lens, and a light emitting diode (LED) being adapted to be disposed in the lens, and the lens having an accommodating portion, a first light exiting surface and a second light exiting surface,
wherein the first light exiting surface is located above the accommodating portion and having a first sub light exiting surface and a second sub light exiting surface, the first sub light exiting surface is a planar surface, and the second sub light exiting surface is a slope or a curved surface, surrounds the first sub light exiting surface and is connected to the second light exiting surface,
the second light exiting surface surrounds the first light exiting surface, located outside the accommodating portion, and has a third sub light exiting surface and a fourth sub light exiting surface, the third sub light exiting surface is a concave and curved surface and connected to the first light exiting surface, and the fourth sub light exiting surface is a curved surface.

2. The lens as claimed in claim 1, wherein the accommodating portion has a top light incident surface and a side light incident surface, the top light incident surface is located above the LED, and the side light incident surface surrounds the top light incident surface, and the LED is located in the side light incident surface.

3. The lens as claimed in claim 2, wherein the first sub light exiting surface is parallel to the top light incident surface.

4. The lens as claimed in claim 2, wherein the fourth sub light exiting surface is coaxial with the side light incident surface of the accommodating portion.

5. The lens as claimed in claim 1, wherein a cross-section of the first light exiting surface has a funnel shape.

6. The lens as claimed in claim 1, wherein a diameter of the first sub light exiting surface is 0.5 mm.

7. A lamp, comprising:
a lampshade;
a base, assembled to the lampshade;
a lens, disposed on the base and located in the lampshade, and having an accommodating portion, a first light exiting surface and a second light exiting surface,
wherein the first light exiting surface is located above the accommodating portion and having a first sub light exiting surface and a second sub light exiting surface, the first sub light exiting surface is a planar surface, and the second sub light exiting surface is a slope or a curved surface, surrounds the first sub light exiting surface and is connected to the second light exiting surface, and
the second light exiting surface surrounds the first light exiting surface, is located outside the accommodating portion, and has a third sub light exiting surface and a fourth sub light exiting surface, the third sub light exiting surface is a concave and curved surface and connected to the first light exiting surface, and the fourth sub light exiting surface is a curved surface; and
a light emitting diode (LED), disposed in the accommodating portion of the lens.

8. The lamp as claimed in claim 7, wherein the accommodating portion has a top light incident surface and a side light incident surface, the top light incident surface is located above the LED, and the side light incident surface surrounds the top light incident surface, and the LED is located in the side light incident surface.

9. The lamp as claimed in claim 8, wherein the first sub light exiting surface is parallel to the top light incident surface.

10. The lamp as claimed in claim 8, wherein the fourth sub light exiting surface is coaxial with the side light incident surface of the accommodating portion.

11. The lamp as claimed in claim 7, wherein a cross-section of the first light exiting surface has a funnel shape.

12. The lamp as claimed in claim 7, wherein a diameter of the first sub light exiting surface is 0.5 mm.

* * * * *